Patented Feb. 22, 1944

2,342,438

UNITED STATES PATENT OFFICE 2,342,438

PROCESS FOR PREPARING 1-(TETRAACYL-d-RIBITYLAMINO)-4,5-DIMETHYLBENZENE

Max Tishler, Rahway, N. J., and John W. Wellman, Cleveland Heights, Ohio, assignors to Merck & Co., Inc., Rahway, N. J., a corporation of New Jersey No Drawing. Application June 18, 1941, Serial No. 398,584. In Canada January 13, 1941

8 Claims. (Cl. 260—211)

This invention relates to new chemical compounds, and processes of preparing the same, and is a continuation-in-part of our co-pending application Serial No. 325,182, filed March 21, 1940, now Patent No. 2,261,608, granted November 4, 1941.

We have discovered that derivatives of 1-amino-4,5-dimethylbenzene having an acylated pentose radical substituted in the amino group as represented by Formula I, derivatives of 1,2-diamino-4,5-dimethylbenzene having an acylated pentose radical substituted in one of the amino groups as represented by Formula II, and derivatives of 1-amino-2-arylazo-4,5-dimethylbenzene having an acylated pentose radical substituted on the amino group as represented by Formula III, are valuable intermediates for preparing tetraacyl riboflavin, or riboflavin.

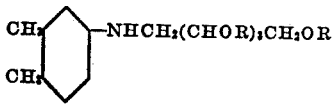

I

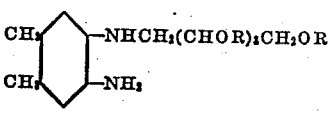

II

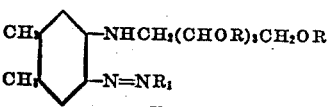

III wherein R is an acyl radical, and $R_1$ is an aryl radical.

We have also discovered that tetraacyl-d-ribonic acid nitrile reacts readily with 1-amino-4,5-dimethylbenzene in the presence of hydrogen and a hydrogenation catalyst such as Pd, Pt, and Ni to give Compound I. This substance may be coupled with diazotized paranitro aniline, diazotized benzidine, or other diazotized aryl amines to produce compounds represented by Formula III. Compounds of this class can be condensed with barbituric acid to form flavins.

Another method of preparing flavins from compounds represented by Formula III is to reduce the azo compounds, for example, by catalytic hydrogenation, to compounds represented by Formula II. The latter compounds react readily with halo barbituric acids to give the corresponding flavins. In addition, such compounds readily react with alloxan to give flavins.

The following example illustrates methods of carrying out our present invention, but it is to be understood that this example is given by way of illustration and not of limitation.

*Example*

A hydrogenating bottle is charged with 8 gms. of 4,5-dimethylaniline, 0.5 gm. of hydroquinone, 0.5 gm. of anhydrous sodium acetate and 1 gm. of palladium oxide. The bottle is then placed in a hydrogenation apparatus and fitted with a separatory funnel, which is kept at about 50° C. A warm solution of 10.5 gms. of tetraacetyl-ribononitrile in 30 cc. of methyl alcohol is then allowed to drop in slowly while hydrogenation is occurring. The addition of the nitrile solution requires about six hours. After all of the nitrile is added, the mixture is shaken with hydrogen for about one hour longer and then filtered. The filtrate is seeded and kept at —50° C. The 1-N-(tetraacetyl-d-ribitylamino)-4,5-dimethylbenzene separates as fine needles, M. P. 97-98° C. Additional quantities of the product may be obtained from the mother liquor by diluting with water, extracting with ether and diluting with petroleum ether. Yield 5.5 gms. The unreacted dimethylaniline may be recovered by concentrating the ether-petroleum ether solution and distilling the residue in vacuum.

3.34 gms. of p-nitroaniline hydrochloride is dissolved by warming in a solution of 3 cc. of concentrated hydrochloric acid in 3 cc. of water. The hot solution is added to 60 cc. of water with stirring and the mixture cooled to 10° C. At this temperature, with stirring, 1.65 gms. of sodium nitrite in 20 cc. of water are added rather rapidly and the mixture allowed to stand for 1½ hours. During this time, nearly all of the nitroaniline hydrochloride goes into solution. The excess of nitrous acid is then destroyed by adding urea, the mixture is filtered from small amounts of insoluble material, and the filtrate is then added rapidly to a stirred solution of 5 gms. of 1-tetraacetyl-d-ribityl-amino-4,5 dimethylbenzene in 125 cc. of acetic acid. After the addition, the mixture is kept at 0-5° C. for four hours and then at room temperature for ten hours. At the beginning, a red, gummy material separates and gradually solidifies. The 1-(tetraacetyl-d-ribitylamino)-2-p-nitrophenylazo-4,5-dimethylbenzene which is deep red, is filtered, washed well with water and dried. It is recrystallized by dissolving in a small amount of hot chloroform and diluting with hot methanol. Yield 6.3 gms., M. P. 168-9° C.

1 gm. of the above azo compound is suspended in 10 cc. of methanol containing 0.05 gm. of platinum oxide. The mixture is shaken with hydrogen until no further absorption of hydrogen occurs. The reaction is very rapid, during which the azo compound goes into solution and a colorless solution is obtained. The mixture is filtered and concentrated to dryness, and 1-(tetraacetyl-d-ribitylamino) - 2 - amino - 4,5-dimethylbenzene is recovered.

Other acyl derivatives may be obtained by employing different acyl compounds as starting materials.

Modifications may be made in carrying out the present invention, without departing from the spirit and scope thereof, and we are to be limited only by the appended claims.

We claim:

1. The process comprising reacting tetraacyl-d-ribonic acid nitrile, and 1-amino-4,5-dimethylbenzene in the presence of hydrogen and a hydrogenation catalyst to produce 1-(tetraacyl-d-ribitylamino)-4,5-dimethylbenzene.

2. The process comprising reacting tetraacetyl-d-ribonic acid nitrile, and 1-amino-4,5-dimethylbenzene in the presence of hydrogen and a hydrogenation catalyst to produce 1-(tetraactyl-d-ribitylamino)-4,5-dimethylbenzene.

3. The process comprising reacting tetraacyl-d-ribonic acid nitrile, and 1-amino-4,5-dimethylbenzene in the presence of hydrogen and a hydrogenation catalyst comprising palladium to produce 1-(tetraacyl-d-ribitylamino) 4,5-dimethylbenzene.

4. The process comprising reacting tetraacyl-d-ribonic acid nitrile, and 1-amino-4,5-dimethylbenzene in the presence of hydrogen and a hydrogenation catalyst comprising platinum to produce 1-(tetraacyl-d-ribitylamino)-4,5-dimethylbenzene.

5. The process comprising reacting tetraacyl-d-ribonic acid nitrile, and 1-amino-4,5-dimethylbenzene in the presence of hydrogen and a hydrogenation catalyst comprising nickel to produce 1-(tetraacyl-d-ribitylamino)-4,5-dimethylbenzene.

6. The process comprising reacting tetraacetyl-d-ribonic acid nitrile, and 1-amino-4,5-dimethylbenzene in the presence of hydrogen and a hydrogen catalyst comprising palladium to produce 1-(tetraacetyl-d-ribitylamino)-4,5-dimethylbenzene.

7. The process comprising reacting tetraacetyl-dribonic acid nitrile, and 1-amino-4,5-dimethylbenzene in the presence of hydrogen and a hydrogenation catalyst comprising platinum to produce 1-(tetraacetyl-d-ribitylamino)-4,5-dimethylbenzene.

8. The process comprising reacting tetraacetyl-d-ribonic acid nitrile, and 1-amino-4,5-dimethylbenzene in the presence of hydrogen and a hydrogenation catalyst comprising nickel to produce 1-(tetraacetyl-d-ribitylamino)-4,5-dimethylbenzene.

MAX TISHLER.
JOHN W. WELLMAN.

CERTIFICATE OF CORRECTION.

Patent No. 2,342,438.  February 22, 1944.

MAX TISHLER, ET AL.

It is hereby certified that error appears in the printed specification of the above numbered patent requiring correction as follows: Page 1, second column, line 20, for "-50° C." read -- -5° C. --; page 2, first column, line 27, claim 2, for "tetraactyl-" read -- tetraacetyl- --; line 33, claim 3, for "1-(tetraacyl-d-ribitylamino) 4,5-di-" read -- 1-(tetraacyl-d-ribitylamino)-4,5-di- --; and second column, line 16, claim 6, for "hydrogen" read --hydrogenation--; line 19-20, claim 7, for "tetraacetyl-dribonic" read --tetraacetyl-d-ribonic--; and that the said Letters Patent should be read with this correction therein that the same may conform to the record of the case in the Patent Office.

Signed and sealed this 9th day of May, A. D. 1944.

(Seal)

Leslie Frazer
Acting Commissioner of Patents.